No. 651,802. Patented June 12, 1900.
H. C. HERR.
COMPUTING SCALE.
(Application filed Nov. 10, 1899.)

(No Model.) 4 Sheets—Sheet 1.

Witnesses. Inventor.
L. M. Billings. Henry C. Herr.
G. A. Neubauer. By A. J. Sangster, Attorney.

No. 651,802. Patented June 12, 1900.
H. C. HERR.
COMPUTING SCALE.
(Application filed Nov. 10, 1899.)
(No Model.) 4 Sheets—Sheet 2.

Witnesses.
L. M. Billings.
G. A. Kaubauer.

Inventor.
Harry C. Herr.
By A. J. Sangster Attorney.

No. 651,802. Patented June 12, 1900.
H. C. HERR.
COMPUTING SCALE.
(Application filed Nov. 10, 1899.)
(No Model.) 4 Sheets—Sheet 3.

Witnesses. Inventor.
L. M. Billings. Henry C. Herr.
G. A. Neubauer. By A. J. Sangster, Attorney.

THE NORRIS PETERS CO., PHOTO-LITHO., WASHINGTON, D. C.

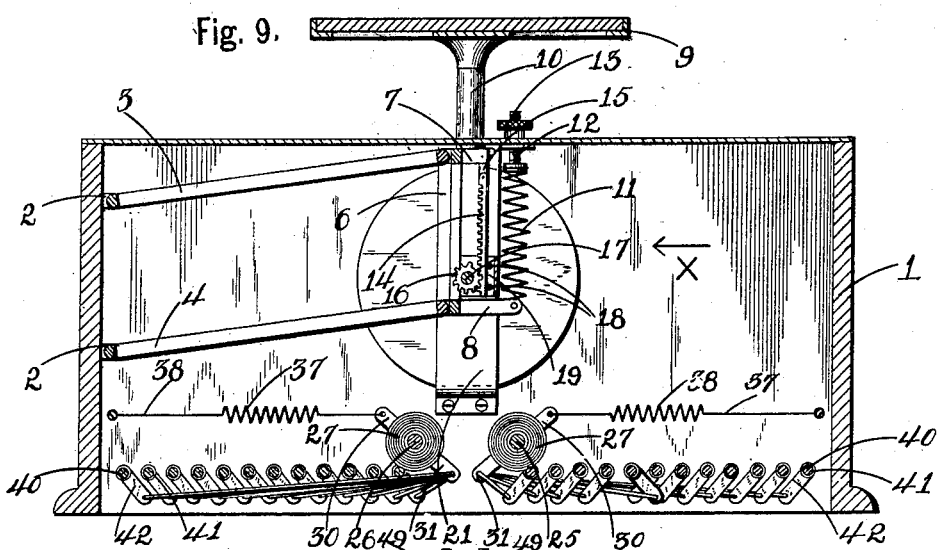

UNITED STATES PATENT OFFICE.

HENRY C. HERR, OF PORT HURON, MICHIGAN, ASSIGNOR TO THE HURON MACHINE WORKS, OF SAME PLACE.

COMPUTING-SCALE.

SPECIFICATION forming part of Letters Patent No. 651,802, dated June 12, 1900.

Application filed November 10, 1899. Serial No. 736,478. (No model.)

*To all whom it may concern:*

Be it known that I, HENRY C. HERR, a citizen of the United States, residing at Port Huron, in the county of St. Clair and State of Michigan, have invented certain new and useful Improvements in Computing-Scales, of which the following is a specification.

My invention relates to an improved scale adapted to weigh light articles and accurately indicate the weight and price of the same and having computing mechanism which acts independently of the weighing mechanism.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof; and to a full disclosure of the invention an adaptation thereof is shown in the accompanying drawings, in which—

Figure 1:
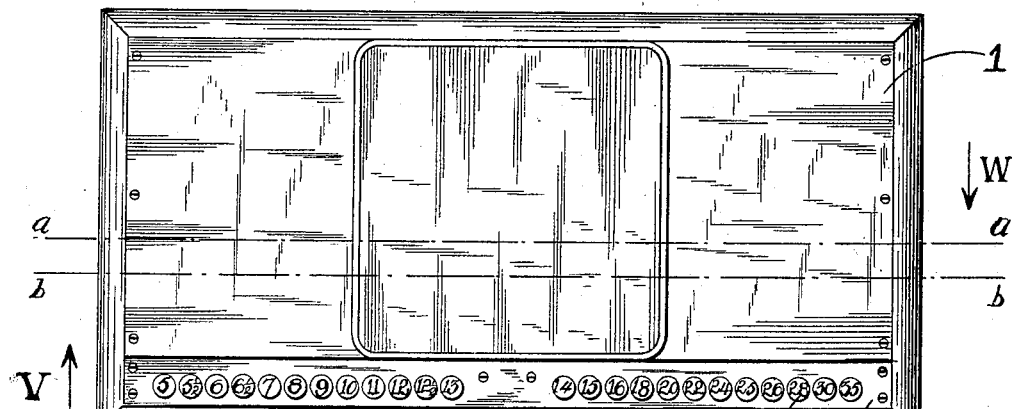
Figure 2:
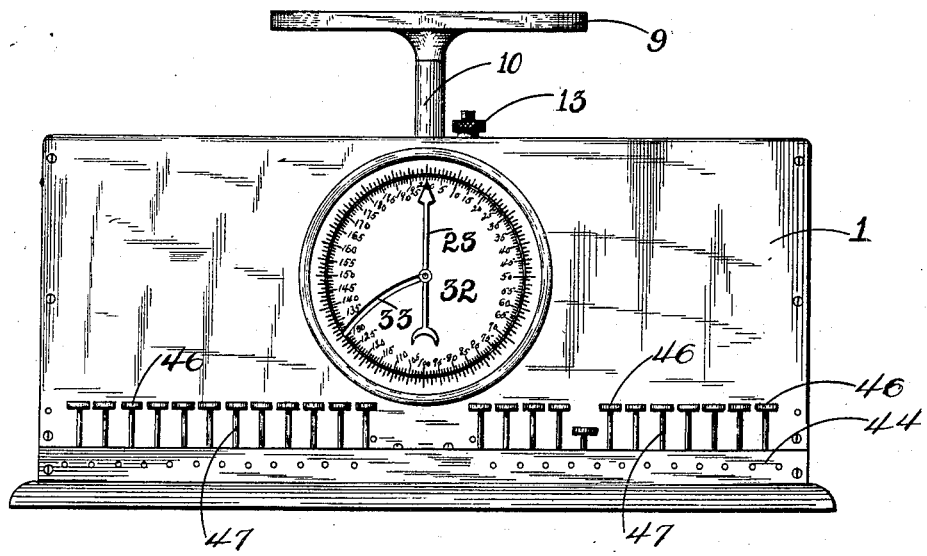
Figure 3:
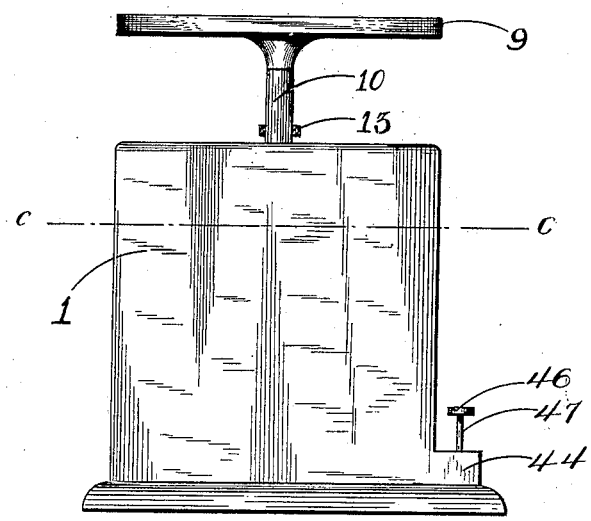
Figure 4:
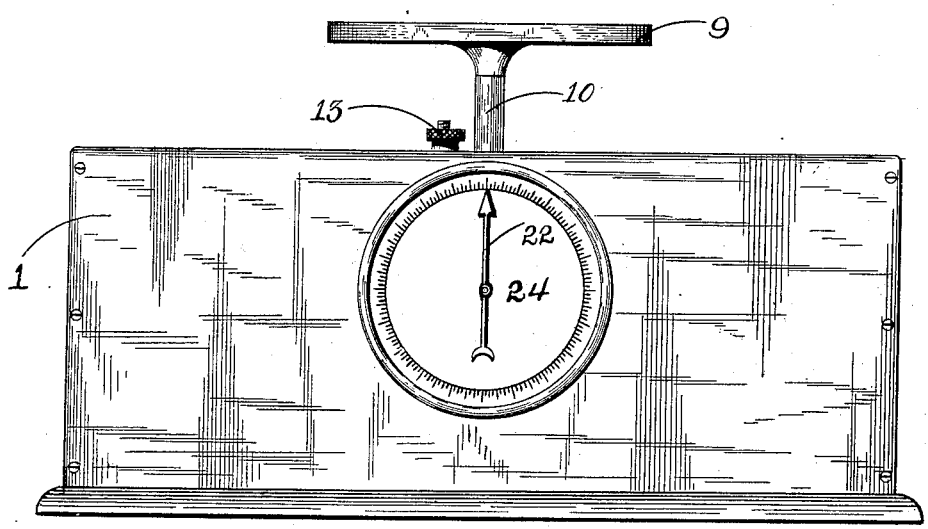
Figures 5, 6, 7, 8:
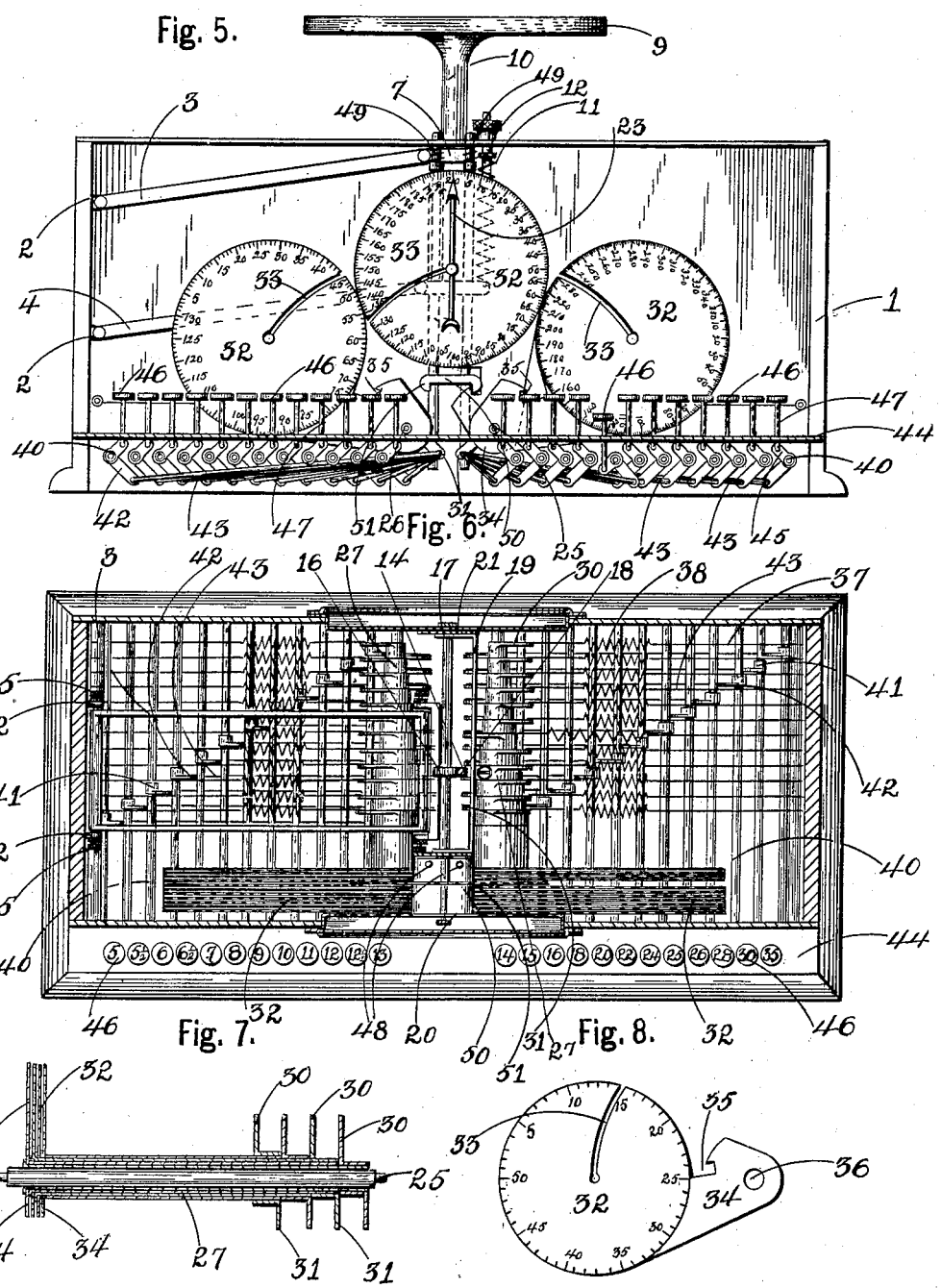

Figure 1 represents a top plan view of the scale complete. Fig. 2 represents a front side elevation. Fig. 3 is an end elevation. Fig. 4 represents a rear side elevation. Fig. 5 is a front side elevation with a part of the casing removed, showing a general view of all the working parts. Fig. 6 is a horizontal section through line $c\,c$, Fig. 3. Fig. 7 is an enlarged view of the shaft carrying the price-indicating dials, a portion being shown in section, the purpose of which will be shown farther on. Fig. 8 is a face view of one of the price-indicating dials. Fig. 9 is a vertical section through line $a\,a$, Fig. 1, looking in the direction of the arrow V. Fig. 10 represents a vertical section through line $b\,b$, Fig. 1, looking in the direction of the arrow W. Fig. 11 is an enlarged cross-section through the shaft carrying the price-indicating dials, as will be shown later on. Fig. 12 is one of the tubes to which the price-indicating dials are attached. Fig. 13 is an end view of the same. Fig. 14 is an enlarged view of a fragment of the mechanism to show the rack-bar and its connecting and supporting mechanism. Fig. 15 is a fragmentary view looking in the direction of the arrow X, Fig. 9, to show the rack-bar and its supporting-rollers.

The weighing or computing mechanism is mounted within a box or casing 1, which is preferably rectangular in form. Four lugs or extensions 2 (see Figs. 5, 6, and 9) project from the interior of the end of the casing, and two rectangular frames 3 and 4, arranged one above the other, are pivoted at one end to said lugs by the screws 5 or other fastening devices. The opposite ends of these frames are pivotally connected to the respective upper and lower ends of a vertical bar 6, having upper and lower horizontal extensions or rods 7 and 8, which are preferably formed integral with said bar 6.

The weighing-platform 9 is provided with a standard or support 10, which is rigidly attached to or formed integral with the upper extension 7. A coil-spring 11 is secured at its lower end to the lower extension 8 and has its upper end attached to a screw-threaded rod 12, which extends through the top of the casing and into screw-threaded engagement with the milled thumb-nut 13. The tension of the spring is adjusted by turning the thumb-nut 13, thus vertically elevating or lowering the rod 12. A toothed rack-bar 14 is pivoted at its upper end to a link 15, which is attached to the upper horizontal extension or rod 7 and engages with a pinion 16, mounted on the main shaft 17, being held in engagement with said pinion by the two small rollers 18, which are journaled in the supports 19. The main shaft 17 is journaled in the side frame-pieces 20 and 21, with its outer ends extending through said side pieces and the sides of the casing, and indicating-hands 22 and 23 are rigidly fastened to said ends on opposite sides of the casing.

A fixed dial 24 is arranged upon the side of the casing to be exposed to the customer and is adapted to indicate the weight of the article placed upon the weighing-platform in pounds and ounces, the indicating-hand 22 being arranged in front of said dial.

The computing mechanism comprises a plurality of movable price-indicating dials, each of which is provided with a series of indicating-numerals arranged to indicate in successive order the price from one pound or a portion of a pound up to a certain number of pounds at a certain fixed price per pound, each price-indicating dial indicating a different price per pound, and means whereby any one of said dials is brought into operation. In my preferred construction the dials are arranged so as to be normally concealed from view in the casing and are brought into operative position and view by moving a key or indicating device connected thereto and marked for quick manipulation with the corresponding price-per-pound valuation.

Two shafts 25 and 26 are journaled in the side frame-pieces 20 and 21 and are arranged on opposite sides of the main shaft 17. A series of tubes 27 are journaled on each shaft and are telescoped into each other, (see Fig. 7,) in which one of the shafts and a section through a series of telescoped tubes is shown. These tubes are fitted or telescoped upon each other, so that a portion of the ends of each inner telescoped tube projects beyond the ends of the next succeeding outer tube or tubes, thus affording means for connecting each tube to its dial and its operating-key. This is preferably done by making the first tube placed upon the shaft of the greatest length and successively reducing the tubes in length as they are fitted or telescoped on each other. By referring to Fig. 12 it will be seen that each tube 27 has a flange 28 at one end and a collar 29, having two arms 30 and 31 projecting in opposite directions at the opposite end.

The movable price-indicating dials 32 are each provided with a circular series of price-indicating characters and have curved slots 33, which extend from the center outwardly through the edge, and an extension 34, having an upper notch or depression 35 and a circular opening 36, corresponding in size to the tube to which it is attached. (See Fig. 8.) In attaching the dials to the tubes they are slipped through the openings 36 until the dials are pressed against the flanges, and they are then rigidly secured by solder or other means. The collars 29 are then slipped into place and rigidly secured by solder or other means. A series of rods 37, having coil-spring portions 38 arranged within the casing and corresponding in number to the telescoped portions and the price-indicating dials, are supported at their rear ends when in inoperative position by transverse supports 39, having concaved supporting-seats, (see Fig. 10,) and are each connected, respectively, to the arm 30 of one of the collars 29. A series of transverse shafts 40 are journaled in the casing, and a collar 41, having a crank-arm 42, is rigidly mounted on each shaft. These collars 41 are arranged on their respective shafts at different distances from the sides of the casing, so that the connecting-rods 43, which connect the arms 31 to the arms 42, each extend longitudinally with respect to the casing, the collar upon each shaft being arranged at substantially the same distance from the side of the casing as the collar upon the telescoped tube to which the rod 43 connects it.

The lower portion of the casing on one side is provided with an extension forming a horizontal shelf 44, and the portions of the shaft 40 projecting under said shelf are provided with crank-arms 45. A series of keys 46 are arranged above the shelf, with their standards 47 extending through openings in said shelf and having their lower ends pivoted to the crank-arms 45. These keys are marked with suitable characters upon their upper surface and correspond in number to the price-indicating dials, each in the above-described manner being connected to one of said dials, so that the depressing of a key will throw or swing the corresponding dial into operating position.

In the adaptation of the invention shown in the drawings twenty-four dials are employed, twelve being arranged on each of the shafts 25 and 26 and twelve tubes being telescoped on each shaft. Twenty-four operating-keys are employed, each being connected by independent mechanism to one of the telescoped tubes to which one of the dials is rigidly attached, as before described. The dials are normally inoperative, with the exception of one, which is arranged concentrically with the shaft 17 in the rear of the indicating-hand 23. To secure the dials in operative position when thrown up by the keys, two rods 48 are mounted in a vertical position in the casing and have a vertical movement therein, a spring 49 is arranged upon the upper end of each rod and serves to maintain said rod in its lower position with a spring tension, and a plate 50, sufficiently long to extend over the top of all the dials, is rigidly mounted upon these rods and has its sides bent downward to form hook portions 51.

To operate the computing mechanism, the proper key is depressed to raise the desired dial, which by means of the connecting mechanism is swung upon its supporting-shaft centrally around the main shaft 17, the curved slot 33 corresponding in form to the arc of the circle traversed by that portion of the dial, so that it easily passes over the shaft, which at that point is reduced in diameter to reduce the width of the slot. (See Fig. 6.) The extension 34 of the dial during the latter portion of its travel presses against the hooked portions 51 of the plate 50 and lifts said plate and its supporting-rods 48 sufficiently to release the previously-employed dial, which immediately resumes its former inoperative position, and as the dial is brought to the limit of its upward movement the hooked portions 51 drop into the notches 35 in the extension and lock the dial in operative position. The dials are arranged so that the flat faces come near together, the collars on the tubes serving to separate them sufficiently, the dial denoting the highest price per pound being preferably arranged nearest the casing, so that it can be read more easily.

To compute the price of an article, it is only necessary to place the dial containing the proper price-per-pound scale in operative position, to illustrate which the dial denoting a price of twenty cents per pound is shown thrown into position, and as the scale in the adaptation illustrated has a capacity of ten pounds, so the dial is divided into two hundred spaces, which indicates that an article weighing ten pounds at twenty cents per pound would amount to two hundred cents, and if the article weighed less the correct amount would be quickly ascertained by noting the position of the indicator-hand and by reading the price-scale the same as the pound-scale. To bring the dial denoting a price of twenty cents per pound into operative position, the key having the price-mark of twenty cents is pressed downward as far as it will go. This movement will cause the crank-arm 45, pivoted to the standard 47 of the key and rigidly attached to the shaft 40, to move downward and partially rotate said shaft 40, and as the dial carrying the twenty-cents scale is rigidly attached to that tube it is swung into position. In doing this the hooked portion of the plate, rigidly secured to the vertical rods, engages in the notch in the extension of the dial, thus holding it in position, as before described. The tube partially rotates to swing the dial into position. The coil-spring portion 38 of the rod 37 is drawn out, so that when the dial is released from the hook portion the spring will act to force the dial to its original position. Each dial is released by the movement of the next dial into operative position by means of the hooked portion passing under the plate and raising it up, thus releasing the dial and permitting the spring to draw it back into its normally-inoperative position. By the above means each price-indicating dial is connected by independent mechanism to the key corresponding in price, so that to press the key containing the price you desire to sell an article at will cause the dial containing that price-scale to be thrown up or brought into operative position, being read the same as the pound-scale, only that it denotes cents instead of pounds and ounces.

The edge of the circular opening in the casing through which the price-indicating dials are shown when thrown up into operative position is provided with a weight-indicating scale, (see Fig. 2,) so that both the price and the weight can be ascertained by the operator from his side of the scale.

I claim as my invention—

1. A scale having weighing mechanism including a rotating shaft provided with an indicator and a plurality of integral circular price-indicating dials pivotally arranged in two series, one on each side of the indicator and means for swinging any one dial of either series into operative position in proximity to the indicator and concentric with the shaft.

2. A scale having weighing mechanism, and a plurality of movable integral circular dials, each having a different price-per-pound scale, any one of which is adapted to be quickly thrown into or out of operative price-indicating position relatively to the weighing mechanism.

3. A scale having a shaft adapted to be rotated by the weighing of an article and provided with an indicator, a plurality of integral circular price-indicating dials, and means for swinging any one of said dials into price-computing position astride the shaft.

4. A scale having a support, a plurality of integral circular independent dials having price-indicating scales and extensions pivotally mounted on the support, and means for bringing any one of said dials into operative price-computing position.

5. A scale having weighing mechanism including a shaft provided with an indicator and a plurality of movable integral circular price-indicating disks arranged in two series, one on each side of the shaft, any one of which is adapted to be moved astride and concentric with the shaft in the rear of the indicator.

6. A scale having a weighing device, indicators having connection with said weighing device, a weight-indicating dial arranged behind one of said indicators, and a plurality of movable integral circular price-indicating dials each having an independent pivotal movement; any one of which is adapted to be moved into operative position behind another indicator.

7. A scale having a weighing device, an indicating-hand having connection with said weighing device, a support, a plurality of movable price-indicating dials pivotally mounted on said support; any one of which is adapted to be moved into operative position behind said hand, and a plurality of operating-keys corresponding in number to said indicating-dials and each one operatively connected by independent mechanism to its corresponding indicating-dial.

8. A scale having a weighing device, a shaft operatively connected to said weighing device and having an indicator at each end, a weight-indicating disk permanently arranged behind one of said indicators, and a plurality of integral circular price-indicating disks having a path of movement in an arc of a circle; any one of which is adapted to be swung astride the shaft and behind the other indicator.

9. A scale having a casing, a weighing device, a shaft connected to said weighing device and having two indicators, a disk having a circular weight-indicating scale arranged behind one of said indicators, and a plurality of integral circular price-indicating disks; any one of which is adapted to be swung astride the shaft and centrally behind the other indicator; the remaining disks being supported in an inoperative position in the casing.

10. A scale having a casing, a weighing device, a shaft connected to said weighing device, and having an indicator, a disk having a circular weight-indicating scale arranged behind said indicator, and a plurality of integral circular price-indicating disks; any one of which is adapted to be swung astride the shaft and centrally behind the indicator; the remaining disks being supported in an inoperative position in the casing.

11. A scale comprising a casing having a circular opening in its front and rear sides, a weighing-platform mounted above said casing, a shaft journaled in said casing and operatively connected with said weighing-platform, two indicating-hands fastened to said shaft, a weight-indicating disk permanently mounted in one of the circular openings behind one of said hands, means for counterbalancing the platform and a plurality of movable integral circular price-indicating disks, one of which is operatively arranged in the other circular opening and behind the other indicating-hand; the remaining disks being supported in an inoperative position in the casing and mechanism for returning said operatively-arranged disk into inoperative position in the casing and moving any one of the inoperative disks into operative position.

12. A scale comprising a casing, a weighing-platform mounted above said casing, a main shaft journaled in said casing and adapted to be rotated by the movement of the platform, indicating-hands fastened to said shaft, a rod on each side of said shaft, a plurality of telescoped tubes journaled on each rod and each having a price-indicating disk, a weight-indicating disk arranged operatively with respect to one of said indicating-hands and means for turning any one of the telescoped tubes to bring its price-indicating disk into operative position with respect to another indicating-hand.

13. A scale comprising a casing, a weighing-platform mounted above said casing, a weight-indicating device supported in the casing and operatively connected to the weighing-platform, a plurality of price-indicating dials, one of which is arranged in price-computing position relatively to the weight-indicating device and the remainder are concealed in inoperative position within the casing, and key-operated mechanism for moving the dial arranged in price-computing position into a concealed inoperative position within the casing and bringing any one of the other dials into view and operative position.

14. A scale having weighing mechanism provided with an indicator-hand, a plurality of movable devices provided with price-indicating scales and each adapted to be brought into operative position relatively to the indicator-hand, and a spring-tensioned locking device for securing said device in operative position.

15. A scale having weighing mechanism provided with an indicator-hand, a plurality of integral circular price-indicating disks, one of which is in price-computing position relatively to the indicator-hand, and the remainder are arranged in a normally-inoperative position, each having a notched portion and each adapted to be changed from an operative position to an inoperative position, and vice versa, and a device having a hook portion adapted to seat in the notch in an operatively-arranged disk to maintain it in said position.

16. A scale having a casing, weighing mechanism supported by said casing and having an indicator, a plurality of price-indicating disks arranged in said casing, each having a notched portion and each adapted to be brought into operative position in proximity to the indicator, rods supported in the casing and having a longitudinal movement therein, and a plate rigidly mounted on the rods and having hooked portions adapted to catch in the notches, as set forth.

17. A scale having a casing, weighing mechanism supported by said casing, a plurality of price-indicating disks arranged in said casing, each having a notched portion and each adapted to be brought into operative position relatively to the weighing mechanism, rods supported in the casing and having a longitudinal movement therein, a plate rigidly mounted upon the rods and having its sides bent downward to form hooked portions adapted to catch in the notches, as set forth.

18. A scale having weighing mechanism, an indicator operated by the movement of the weighing mechanism, a plurality of price-indicating disks, and key-operated mechanism for moving any of said disks into operative position relatively to the indicator.

19. A scale having weighing mechanism provided with an indicator, a plurality of price-indicating disks, one of which is arranged in operative position relatively to the indicator, and the remainder in inoperative position, means within reach of the operator for moving any one of the inoperatively-arranged disks into operative position and mechanism for securing said disk in its operative position; said securing mechanism being automatically operated by the movement of the inoperatively-arranged disk into operative position to release the first-mentioned disk and permit it to resume its former inoperative position.

20. A scale having weighing mechanism provided with an indicator, a plurality of price-indicating disks; one of which is in operative position relatively to the indicator and the remainder in inoperative position, springs for maintaining said inoperatively-arranged disks in their position with a spring tension, means within reach of the operator for moving any one of said disks into operative position and mechanism for securing said disk in its operative position; said mechanism being automatically operated by the movement of another of said disks into operative position to release the first-mentioned disk and permit the springs to restore said first-mentioned disk to its original inoperative position.

21. A scale comprising a casing, a weighing-platform mounted above said casing, a series of rods pivotally mounted in the casing and connected to said platform, a toothed rack-bar connected to said rods, a spring for normally maintaining said series of rods and the weighing-platform in an elevated position, a shaft journaled in the casing and having a gear-wheel meshing with the teeth in the rack, an indicator-hand at each end of said shaft, a weight-indicating dial arranged behind one of said hands, a plurality of price-indicating dials and key-operated mechanism for arranging any one of said dials astride the shaft and directly behind the other hand, as set forth.

22. A scale comprising a casing, a weighing-platform mounted above said casing, a series of rods pivotally mounted in the casing and connected to said platform, a toothed rack-bar connected to said rods, a spring for normally maintaining said series of rods and the weighing-platform in an elevated position, a shaft journaled in the casing and having a gear-wheel meshing with the teeth in the rack, an indicator-hand at each end of said shaft, a weight-indicating dial arranged behind one of said hands, a plurality of price-indicating dials supported in the casing, and mechanism for moving any one of said price-indicating dials into operative position behind the other hand, as set forth.

23. In a computing-scale the combination with the weighing mechanism, of a shaft rotated by the movement of said weighing mechanism and having an indicator-hand, and a plurality of integral circular price-indicating dials, each of which is adapted to be moved astride the shaft in the rear of the indicator-hand and each having a slot for the passage of the shaft, as set forth.

24. A scale comprising a casing, a weighing-platform mounted above said casing, a toothed rack-bar having connection with said platform, a shaft journaled in the casing and having a gear-wheel meshing with the teeth in the rack, an indicator-hand rigidly mounted on said shaft, a plurality of circular price-indicating dials normally concealed within the casing and each having a slot curving from its center outward and adapted to form a slideway for the shaft, and means for swinging any one of said dials into position behind the indicator-hand and concentric with the shaft, as set forth.

25. In a computing-scale, the combination with the weighing-platform, of a shaft rotated by the movement of said weighing-platform and having an indicator-hand, a plurality of price-indicating dials, each of which is adapted to be moved astride the shaft in the rear of the indicator-hand and each having a slot for the passage of the shaft, a like plurality of operating devices and mechanism connecting the operating devices to the dials, as set forth.

26. In a computing-scale, the combination with the supporting-casing and the weighing mechanism, of a shaft rotated by the movement of said weighing mechanism and having an indicator-hand, rods arranged on each side of said shaft, a plurality of telescoped tubes journaled on each of said rods, a like plurality of indicting-disks, each rigidly attached to one end of one of said tubes, a like plurality of collars, each having two oppositely-extending arms and rigidly fastened to the opposite end of one of said tubes, a like plurality of extensible spring-tensioned rods, each connected at one end to one of the arms of one of the collars and at the opposite end to the casing, a like plurality of shafts, each having crank-arms, a like plurality of operating-keys, each pivoted to one of the crank-arms of one of said shafts and a like plurality of rods, each connecting a crank-arm of one of the shafts with the arms of the collar on one of the tubes, as set forth.

27. In a computing-scale, the combination with the supporting-casing and the weighing-platform, of a shaft supported in the casing and rotated by the movement of said weighing-platform and having an indicator-hand, and a plurality of price-indicating dials each of which is adapted to be moved astride the shaft in the rear of the indicator-hand and each having a curved slot for the passage of the shaft, as set forth.

28. In a computing-scale, the combination with the supporting-casing and the weighing-platform, of a shaft supported in the casing and rotated by the movement of said weighing-platform and having an indicator-hand, a plurality of price-indicating dials, each of which is adapted to be moved astride the shaft in the rear of the indicator-hand and each having a curved slot for the passage of the shaft, a like plurality of operating-keys and a like plurality of trains of mechanism, each train of mechanism independently connecting one of the keys to one of the dials, as set forth.

29. The combination with the weighing-platform, of an indicator operatively connected to said weighing-platform, a plurality of movable price-indicating dials, each denoting a different price per pound and each adapted to be moved into operative position relatively to the indicator, a like plurality of operating-keys and a like plurality of independent trains of mechanism, each operatively connecting one of the keys to one of said price-indicating dials.

30. The combination with the weighing mechanism, of a plurality of price-indicating devices, each provided with a different price-per-pound scale; one of said devices being in operative position relatively to the weighing mechanism and the remainder in inoperative position, a like plurality of independent trains of mechanism, each operatively connected to one of said price-indicating devices, and a like plurality of keys, each connected to one of said trains of mechanism and adapted to move the corresponding price-indicating device into operative position.

31. The combination with the weighing mechanism, of a plurality of price-indicating devices, each provided with a different price-per-pound scale; one of said devices being in operative position relatively to the weighing mechanism, and the remainder in inoperative position, a like plurality of independent trains of mechanism, each operatively connected to one of said price-indicating devices, and a like plurality of keys, each connected to one of said trains of mechanism and adapted to move the corresponding price-indicating device into operative position, the moving of one of the inoperative devices into position restoring the former operatively-arranged device to an inoperative position.

HENRY C. HERR.

Witnesses:
W. L. JENKS,
P. H. PHILLIPS.